United States Patent
Miyamoto et al.

(10) Patent No.: US 6,827,767 B2
(45) Date of Patent: Dec. 7, 2004

(54) INK FOR BALL-POINT PEN AND BALL-POINT PEN

(75) Inventors: Masaru Miyamoto, Yokohama (JP); Shigeru Miyazaki, Yokohama (JP); Youji Takeuchi, Yokohama (JP)

(73) Assignee: Mitsubishi Pencil Kabushikikaisha, Tokyo (JP)

( * ) Notice: Subject to any disclaimer, the term of this patent is extended or adjusted under 35 U.S.C. 154(b) by 47 days.

(21) Appl. No.: 10/149,656

(22) PCT Filed: Dec. 20, 2000

(86) PCT No.: PCT/JP00/09034

§ 371 (c)(1),
(2), (4) Date: Jun. 14, 2002

(87) PCT Pub. No.: WO01/48104

PCT Pub. Date: Jul. 5, 2001

(65) Prior Publication Data

US 2003/0005855 A1 Jan. 9, 2003

(30) Foreign Application Priority Data

Dec. 24, 1999 (JP) ............................................ 11-365803

(51) Int. Cl.[7] ........................... C09D 11/16; C09D 11/18
(52) U.S. Cl. ................. 106/31.13; 106/31.27; 106/31.59; 106/31.6; 106/31.89
(58) Field of Search ........................... 106/31.13, 31.27, 106/31.59, 31.6, 31.89

(56) References Cited

U.S. PATENT DOCUMENTS

| 5,034,058 | A | * | 7/1991 | Akiyama et al. ......... 106/31.51 |
| 5,069,719 | A | * | 12/1991 | Ono ............................ 524/130 |
| 5,514,208 | A | * | 5/1996 | Nagai et al. .............. 106/31.43 |
| 5,965,634 | A | * | 10/1999 | Idogawa et al. ............. 523/161 |
| 6,048,914 | A | | 4/2000 | Goto et al. .................. 523/161 |
| 6,146,452 | A | * | 11/2000 | Takeuchi .................. 106/31.58 |
| 6,264,729 | B1 | * | 7/2001 | Miyamoto et al. ........ 106/31.36 |

FOREIGN PATENT DOCUMENTS

| JP | 60-090276 A | 5/1985 |
| JP | 02-240173 A | 9/1990 |
| JP | 09-316383 A | 12/1997 |
| JP | 11-029733 A | 2/1999 |
| JP | 2000-080317 A | 3/2000 |

* cited by examiner

Primary Examiner—Helene Klemanski
(74) Attorney, Agent, or Firm—Kubovcik & Kubovcik

(57) ABSTRACT

In a ballpoint pen which is formed to have an ink-consumption value per unit area of 0.64 to 1.6 mg/cm$^2$, the surface tension of the ink for the ball point pen is adjusted to a range of 16 to 32 mN/m so that blotting, line splitting and the like hardly occur, that the ink transferred onto the paper surface is ready to be dried and that fluctuation in the density and width of the written lines are less likely to occur due to a storage environment and to a writing condition.

2 Claims, No Drawings

INK FOR BALL-POINT PEN AND BALL-POINT PEN

TECHNICAL FIELD

The present invention relates to ink for a ballpoint pen which is called medium viscosity ink, neutral ink, gel ink, aqueous gel ink or the like, and to a ballpoint pen using the ink for a ballpoint pen, more specifically the present invention relates to ink for a ballpoint pen which consumes much ink, that is, a ballpoint pen for writing thick and bold letters and a ballpoint pen using the ink for a ballpoint pen.

BACKGROUND ART

Various types of ballpoint pen have been proposed conventionally.

For example, there is provided a ballpoint pen filled with ink using water or an aqueous medium as a solvent and dye or pigment as a colorant. Hereinafter the ink is referred to as "aqueous ink" and the ballpoint pen as an "aqueous ballpoint pen."

The aqueous ballpoint pen shows so low viscosity that it may advantageously write smoothly at low writing-pressure. On the other hand, however, it is likely to occur that, since the pen is weak to vibration or impact, the ink leaks from the point of pen-tip (hereinafter referred to as "direct flow") and that the stability of the ink-flow rate decreases (hereinafter referred to as "fluctuating") by the air involved from the point of the pen-tip. Further, the aqueous ballpoint pen also has a defect that lines written therewith tend to be blurred.

Meanwhile, there is also provided a ballpoint pen filled with ink using an organic medium as a solvent and dye or pigment as a colorant. Hereinafter the ink is referred to as "oil-based ink" and the ballpoint pen as an "oil-based ballpoint pen."

Since the oil-based ballpoint pen uses highly viscous ink, it is free from above-mentioned defects as seen in the aqueous ballpoint pen. However, it has a defect that high writing pressure is needed for writing, resulting in a heavy writing feeling. Further, it also has a defect that it is likely to make the pen-tip and the paper surface dirty with ink blots (hereinafter referred to as "blotting").

There has recently been provided a ballpoint pen filled with ink using water or a water-soluble medium as a solvent, dye or pigment as a colorant and, further, a pseudoplasticizing so that the ink may have pseudoplasticity. Hereinafter the of ink is referred to as "aqueous gel ink" and the ballpoint pen as an "aqueous-gel ballpoint pen."

Here, pseudoplasticity is a property showing non-flowability in a static state and also showing flowability when a shearing force is applied.

The aqueous gel ink shows non-flowability in an ink reservoir as well as the oil-based ink while it shows flowability like aqueous ink near the point of the pen-tip where a shearing force is applied to the ink due to the rotation of the ball.

Accordingly, the aqueous-gel ballpoint pen has both the advantage of an aqueous ballpoint pen and that of an oil-based ballpoint pen. That is, the aqueous-gel ballpoint pen has advantages that it can write smoothly at a low writing pressure, that the lines written there with are hard to blur and that the blotting is less likely to occur.

Actually, however, the production of the aqueous-gel ballpoint pen is not so easy.

For example, a pen-tip containing a ball with a diameter of 0.5 mm and a pen-tip containing a ball with a diameter of 0.7 mm are different in the clearance between the ball and a holder as well as in the shearing force applied to the ink caused by rotation of the ball.

Therefore, if aqueous gel ink suitable for one of these two types of pen-tips is used for the other, the direct flow and fluctuating will occur or the blotting will occur.

Accordingly, the viscosity of the aqueous gel ink is adjusted in accordance with the pen-tip to be used.

Further, an aqueous-gel ballpoint pen with which relatively thick and bold letters (hereinafter referred to as an "aqueous-gel bold ballpoint pen") can be written is desired recently.

The aqueous-gel bold ballpoint pen uses a ball with a diameter of 0.9 mm or more so as to be adapted for writing bold letters.

Further, the aqueous-gel bold ballpoint pen is formed to have a relatively large clearance between the ball and the holder since, only by enlarging the diameter of the ball, the written line, which can be wider, appears pale in color.

Moreover, the aqueous-gel bold ballpoint pen needs so much ink to be supplied to the pen-tip as to account for the amount according to wider lines due to the larger diameter of the ball and the amount according to the increase of the flow rate due to the larger clearance between the ball and the holder.

Specifically, ink should be supplied to the pen-tip so that the ink-consumption value per unit area may fall within a range on the order of 0.64 to 1.6 $mg/cm^2$.

This ink consumption corresponds to as much as 1.5 to 3 times that of a conventional aqueous-gel ballpoint pen.

Here, the ink-consumption value per unit area means a value of the ink-consumption value per unit length which is divided by the line width.

For example, the ink-consumption value per unit length of an aqueous-gel bold ballpoint pen is preferably on the order of 300 to 750 mg/100 m. When the ink-consumption value per unit length is 300 mg/100 m or less, written lines appear pale in color. On the other hand, when the ink-consumption value per unit length is 750 mg/100 m or more, the ink transferred onto the paper surface will be harder to dry.

The line width by the ball with a diameter of 1.0 mm, though it may vary due to the quality of paper, is on the order of 0.47 mm when written on the writing test paper in compliance with ISO standard 14145-1.

Accordingly, the ink-consumption value per unit area of an aqueous-gel bold ballpoint pen is on the order of 0.64 to 1.6 $mg/cm^2$.

Actually, however, the preparation of the ink for an aqueous-gel bold ballpoint pen is very difficult.

For example, when ink suitable for a pen-tip with a ball with a diameter of 0.5 mm is used for a pen-tip with a ball with a diameter of 1.0 mm, the blotting and a phenomenon that a written line splits into plural lines (hereinafter referred to as "line splitting") is likely to occur due to the larger clearance between the ball and the holder becomes and to the less shearing force applied to the ink caused by rotation of the ball.

In addition, the amount of ink flow from the point of the pen-tip increases in the aqueous-gel bold ballpoint pen, and consequently the ink transferred onto the paper surface becomes harder to dry.

Further, since the amount of ink flow from the point of the pen-tip becomes unstable in such an aqueous-gel bold ballpoint pen due to a storage environment and to a writing condition, there occurs a wide variation in the density and width of the written lines.

DISCLOSURE OF THE INVENTION

Accordingly, the object of the present invention is to provide ink for a ballpoint pen to be used in an aqueous-gel bold ballpoint pen as described above which is unlikely to cause blotting or line splitting, which is excellent in quick drying property when transferred onto the paper surface and which is unlikely to cause fluctuation in the density and width of the written lines due to a storage environment and to a writing condition.

Further, the object of the present invention is to provide an aqueous-gel bold ballpoint pen as described above which is unlikely to cause blotting or line splitting, which is excellent in quick drying property when transferred onto the paper surface and which is unlikely to cause fluctuation in the density and width of the written lines due to a storage environment and to a writing condition.

The present inventors have made intensive studies to achieve the above-described objects and found that a ballpoint pen formed to have an ink-consumption value per unit area of 0.64 to 1.6 mg/cm$^2$, when the surface tension of the aqueous gel ink to be used is adjusted to a range of 16 to 32 mN/m, is unlikely to cause blotting and line splitting. They also found that the ink transferred onto the paper surface therewith is excellent in quick drying property and that the density and the width of the lines written therewith are unlikely to vary due to a storage environment and to a writing condition, and thus completed the following inventions.

Namely, the present invention is characterized in that ink for a ballpoint pen to be used in a ballpoint pen formed to have an ink-consumption value per unit area of 0.64 to 1.6 mg/cm$^2$ has surface tension adjusted to a range of 16 to 32 mN/m.

Here, the term "ink-consumption value per unit area" means a value obtained by dividing an "ink-consumption value per unit length" by the "line width."

The term "ink-consumption value per unit length" means an ink-consumption value per unit length according to ISO standards.

The ink-consumption value per unit length can be measured by using a writing test machine in compliance with ISO standard 14145-1 under specified conditions (e.g., at a writing speed of 4.5 m/min, a writing angle of 60° and a writing load of 100 g).

The term "line width" means a width of a line written on the paper.

The line width may vary depending on the quality of paper but it is on the order of 0.47 mm when the line is written on the writing test paper in compliance with ISO standard 14145-1 by a ball with a diameter of 1.0 mm.

As described above, since the ink-consumption value per unit length of an aqueous-gel bold ballpoint pen is preferably on the order of 300 to 750 mg/100 m, the ink-consumption value per unit area of an aqueous-gel bold ballpoint pen with a ball with a diameter of 1.0 mm, for instance, is on the order of 0.64 to 1.6 mg/cm$^2$.

Here, the term "surface tension" means the surface tension in accordance with ISO standard.

The surface tension can be measured by a vertical plane method using a surface tension meter manufactured by, for example, Kyowa Interface Science Co., Ltd.

And when the surface tension of the ink for a ballpoint pen to be used in a ballpoint pen formed to have a consumption value per unit area of 0.64 to 1.6 mg/cm$^2$, that is, in a ballpoint pen for writing thick and bold letters is adjusted to a range of 16 to 32 mN/m, writing with the ballpoint pen, blotting and line splitting is unlikely to occur, the ink transferred onto the paper surface is easier to dry, and the fluctuation in the density and width of the written lines is unlikely to occur due to a storage environment and to a writing conditions.

If the surface tension of the ink for a ballpoint pen is 16 mN/m or less, direct flow is likely to occur and pigment used there in is likely to coagulate and sediment. On the other hand, if the surface tension of the ink for a ballpoint pen is 32 mN/m or more, blotting and line splitting are likely to occur, the ink transferred onto the paper surface is hard to dry, and further the ink-flow rate becomes unstable due to a storage environment and to a writing conditions, thereby making fluctuation in the density and width of the written lines more likely to occur.

Moreover, the ink for a ballpoint pen, in addition to the above-mentioned character, is characterized in that it includes fluorine surfactant in an amount of 0.01 to 1.5 wt %.

Here, the possible examples of the "fluorine surfactant" are perfluoroalkylethylene oxide adducts (e.g., SURFLON S-145 (trade name, Asahi Glass Co., Ltd.) and UNIDYNE DS-401 (trade name, Daikin Industries Ltd.)); perfluoroalkyltrimethylammonium salts (e.g., MEGAFAC F-150 (trade name, Dainippon Ink and Chemicals, Inc.)); perfluoroalkylcarboxylate salts (e.g., SURFLON S-111 (trade name, Asahi Glass Co., Ltd.)); copolymers of polyoxyalkylene glycol monoester acrylate and N-perfluorooctylsulfonyl-N-propylaminoethyl acrylate (e.g., EF-352 (trade name, Tochem Products)); fluorinated alkyl esters (e.g., Fluorad FC-430 (trade name, Sumitomo 3M Ltd.)); perfluoroalkylsulfonate salts; oligomers containing perfluoroalkyl group and hydrophilic group; urethanes containing perfluoroalkyl group and hydrophilic group; perfluoroalkyl phosphates; perfluoroalkyl betaines; perfluoroalkylamine oxides; perfluoroalkylammonium salts; perfluoroalkyl alkoxylates; perfluoroalkyl polyoxyethyleneethanol; etc.

Addition of the fluorine surfactant in an amount of 0.01 to 1.5 wt % facilitates the surface tension of ink for a ballpoint pen to be adjusted to a range of 16 to 32 mN/m. Moreover, when such an adjusted ink for a ballpoint pen is used in a ballpoint pen, it is possible to make blotting and line splitting less likely to occur, to make the ink transferred onto the paper surface easier to dry, and further to make the fluctuation in the density and width of the written lines less likely to occur due to a storage environment and to a writing condition.

If the content of fluorine surfactant is 0.01 wt % or less, surface tension of the ink shows 32 mN/m or more, blotting and line splitting are likely to occur, the ink transferred onto the paper surface is hard to dry, and further the ink-flow rate becomes unstable due to a storage environment and to a writing condition, thereby causing fluctuation in the density and width of the written lines more likely to occur. On the other hand, if the content of fluorine surfactant is 1.5 wt % or more, surface tension of the ink shows 16 mN/m or less, direct flow is likely to occur and the pigment used therein likely to coagulate and sediment.

Further, the present invention is characterized in that a ballpoint pen formed to have an ink-consumption value per unit area of 0.64 to 1.6 mg/cm$^2$ is filled with ink for a ballpoint pen which has surface tension adjusted to a range of 16 to 32 mN/m.

When a ballpoint pen formed to have a consumption value per unit area of 0.64 to 1.6 mg/cm$^2$, that is, a ballpoint pen for writing thick and bold letters is filled with ink whose surface tension is adjusted to a range of 16 to 32 mN/m, blotting and line splitting are less likely to occur, the ink transferred onto the paper surface is easier to dry, and further the fluctuation in the density and width of the written lines is less likely to occur due to a storage environment and to a writing condition when such a ballpoint pen is used for writing.

If the surface tension of the ink for a ballpoint pen is 16 mN/m or less, direct flow is likely to occur and pigment used therein is likely to coagulate and sediment. On the other hand, if the surface tension of the ink for a ballpoint pen is 32 mN/m or more, blotting and line splitting are likely to occur, the ink transferred onto the paper surface is hard to dry, and further the ink-flow rate becomes unstable due to a storage environment and to a writing conditions, thereby making fluctuation in the density and width of the written lines more likely to occur.

BEST MODE FOR CARRYING OUT THE INVENTION

Embodiments of the ink for a ballpoint pen and the ballpoint pen using the ink for a ballpoint pen according to the present invention will be hereinafter described.

Ink for a Ballpoint Pen

The ink for a ballpoint pen according to an embodiment of the present invention is to be used in a ballpoint pen which is formed to have an ink-consumption value per unit area of 0.64 to 1.6 mg/cm$^2$ and the surface tension thereof is adjusted to a range of 16 to 32 mN/m.

The ink for a ballpoint pen according to the embodiment also contains colorant, water-soluble medium, fluorine surfactant, humectant, lubricant, preservative, rust preventive, pH-adjusting agent, thickener, water, etc.

Colorant

Any kind of dye or pigment which has been used for ink for a ballpoint pen and which can be dissolved or dispersed in water can be used as colorant.

Specifically, for example, following acid dyes can be used as colorant: C.I. Acid Black 1, 2, 24, 26, 31, 52, 107, 109, 110, 119 and 154; C.I. Acid Yellow 7, 17, 19, 23, 25, 29, 38, 42, 49, 61, 72, 78, 110, 141, 127, 135 and 142; C.I. Acid Red 8, 9, 14, 18, 26, 27, 35, 37, 51, 52, 57, 82, 87, 92, 94, 111, 129, 131, 138, 186, 249, 254, 265, and 276; C.I. Acid Violet 15 and 17; C.I. Acid Blue 1, 7, 9, 15, 22, 23, 25, 40, 41, 43, 62, 78, 83, 90, 93, 103, 112, 113 and 158; and C.I. Acid Green 3, 9, 16, 25 and 27.

For example, following basic dyes can also be used as colorant: C.I. Basic Yellow 1, 2 and 21; C.I. Basic Orange 2, 14 and 32; C.I. Basic Red 1, 2, 9 and 14; C.I. Basic Violet 1, 3 and 7; C.I. Basic Brown 12; and C.I. Basic Black 2 and 8.

In addition, for example, following direct dyes can also be used as colorant: C.I. Direct Black 17, 19, 22, 32, 38, 51 and 71; C.I. Direct Yellow 4, 26, 44 and 50; C.I. Direct Red 1, 4, 23, 31, 37, 39, 75, 80, 81, 83, 225, 226 and 227; and C.I. Direct Blue 1, 15, 71, 86, 106 and 119.

In addition, for example, following inorganic pigments can also be used as colorant: titanium oxide, carbon black, red ironoxide, chromiumoxide, black ironoxide, cobalt blue, alumina white, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder, stainless steel powder, nickel powder, copper powder, zinc powder and bronze powder.

In addition, for example, following organic pigments can also be used as colorant: azo lake, insoluble azo pigments, chelate azo pigments, phthalocyanine pigments, perylene and perinone pigments, anthraquinone pigments, quinacridone pigments, dye lakes, nitropigments andnitroso pigments, more specifically, organic pigments such as phthalocyanine blue (C.I. 74160), phthalocyanine green (C.I. 74260), Hansa yellow 3G (C.I. 11670), disazo yellow GR (C.I. 21100), Permanent red 4R (C.I. 12335), Brilliant carmine 6B (C.I. 15850) and quinacridone red (C.I. 46500).

Each of these dyes and pigments may be used alone or two or more of them may be used in combination.

The content of the colorant is preferably on the order of 0.1 to 40 wt % to the total amount of the ink for a ballpoint pen. If the content of the colorant is 0.1 wt % or less, written lines look pale in color. On the other hand, if the content of the colorant 40 wt % or more, the ink becomes unstable during the time course.

Water-soluble Medium

Any kind of polar solvent which can dissolve in water can be used as water-soluble medium.

Specifically, following polar solvents can be used as water-soluble medium: alkyleneglycols such as ethyleneglycol, diethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,5-diol, 1,2,3-butanetriol, 1,2,4-butanetriol, 3-methylpentane-1,3,5-triol and 1,2,3-hexanetriol; polyalkylene glycols such as polyethylene glycol and polypropylene glycol; glycerols such as glycerol, diglycerol and triglycerol; loweralkyl ethersofglycols such as ethylene glycol monomethyl ether, ethylene glycol monoethyl ether, diethylene glycol monomethyl ether, diethylene glycol monoethyl ether and diethylene glycol mono-n-butyl ether; thiodiethanol; N-methyl-2-pyrrolidone; 1,3-dimethyl-2-imidazolidinone; and sulfolane.

Each of these polar solvents may be used alone or two or more of them may be used in combination.

The content of the water-soluble medium is preferably on the order of 1 to 40 wt % to the total amount of the ink for a ballpoint pen. If the content of the water-soluble medium is 1 wt % or less, writing feeling is deteriorated. On the other hand, if the content of the water-soluble medium is 40 wt % or more, the ink transferred onto the paper surface becomes hard to dry.

Fluorine Surfactant

Any kind of surfactant which contains fluorine and can be dissolved or dispersed in water can be used as fluorine surfactant.

Specifically, for example, perfluoroalkylethylene oxide adducts (e.g., SURFLON S-145 (trade name, Asahi Glass Co., Ltd.) and UNIDYNEDS-401 (tradename, Daikin Industries, Ltd.)), perfluoroalkyltrimethylammonium salts (e.g., MEGAFAC F-150 (trade name, Dainippon Ink and Chemicals, Inc.)), perfluoroalkylcarboxylate salts (e.g., SURFLON S-111 (trade name, Asahi Glass Co., Ltd.)), copolymers of polyoxyalkylene glycol monoester acrylate and N-perfluorooctylsulfonyl-N-propylaminoethyl acrylate (e.g., EF-352 (trade name, Tochem Products)), fluorinated alkyl esters (e.g., Fluorad FC-430 (trade name, Sumitomo 3M Ltd.)), perfluoroalkylsulfonate salts, oligomers containing perfluoroalkyl group and hydrophilic group, urethanes containing perfluoroalkyl group and hydrophilic group, perfluoroalkyl phosphates, perfluoroalkyl betaines, perfluoroalkylamine oxides, perfluoroalkylammonium salts, perfluoroalkyl alkoxylates, perfluoroalkyl polyoxyethyleneethanol, etc. can be used.

Addition of fluorine surfactant in an amount 0.01 to 1.5 wt % to the total amount of the ink for a ballpoint pen facilitates the surface tension of ink for a ballpoint pen to be adjusted to a range of 16 to 32 mN/m.

Each of these fluorine surfactants may be used alone or two or more of them may be used in combination.

If the content of fluorine surfactant is 0.01 wt % or less, blotting and line splitting are likely to occur, the ink transferred onto the paper surface is hard to dry, and further the ink-flow rate becomes unstable due to a storage environment and to a writing condition, thereby causing fluctuation in the density and width of the written lines more likely to occur. On the other hand, if the content of fluorine surfactant is 1.5 wt % or more, surface tension of the ink shows 16 mN/m or less, direct flow is likely to occur and the pigment used therein likely to coagulate and sediment.

Humectant

Sugars such as reducing sugars comprising maltitol as a major component, reducing sugars comprising sorbitol as a major component, reducing oligosaccharides, reducing maltooligosaccharides, dextrins, maltodextrins, reducing dextrins, reducing maltodextrins, α-cyclodextrin, β-cyclodextrin, maltosylcyclodextrins, hardly digestible dextrins, reducing starch hydrolyzates, xylitol, saccharose, maltitol, reducing saccharified starches and reducing maltose can be used as humectant.

Specifically, for example, TK-16 and TK-75 (trade name, Matsutani Chemical Industry Co., Ltd.), Diatol N and Diatol K (trade name, San-ei Sucrochemical Co., Ltd.), SE 20 and SE 58 (trade name, Nikken Chemicals Co., Ltd.), PO-300 and PO-20 (trade name, Towa Chemical Industry Co., Ltd.), etc. can be used as humectant.

Each of these sugars may be used alone or two or more of them may be used in combination.

The content of the humectant is preferably on the order of 0.1 to 10 wt % to the total amount of the ink for a ballpoint pen. If the content of the humectant is 0.1 wt % or less, effect of the humectant cannot be exhibited. On the other hand, if the content of the humectant is 10 wt % or more, the ink becomes hard to dry when transferred onto the paper surface.

Lubricant

Fatty acid salts and nonionic surfactants can be used as lubricant.

Specifically, for example, aliphatic acids such as potassium linoleate, potassium oleate and sodium oleate and nonionic surfactants such as glycerine fatty acid esters, polyglycerine fatty acid esters, propylene glycol fatty acid esters, pentaerythritol fatty acid esters, polyoxyethylene sorbitanfattyacidesters, pentaerythritol fattyacidesters, polyoxyethylene sorbitan fatty acid esters, polyoxyethylene sorbit fattyacidesters, polyoxyethylene glycerine fattyacid esters, polyethylene glycol fatty acid esters, polyoxyethylene alkyl ethers, polyoxyethylene fitosterol, polyoxyethylene polyoxypropylene alkyl ethers, polyoxyethylene alkylphenyl ethers, polyoxyethylene castor oil, polyoxyethylene lanolin, polyoxyethylene lanolin alcohol, polyoxyethylene alkylamines, polyoxyethylene fatty acid amides and polyoxyethylene alkylphenylformaldehyde condensation products can be used as lubricant.

Each of these aliphatic acids and nonionic surfactants may be used alone or two or more of them may be used in combination.

Preservative

For example, sodiumomadine, 1,2-benzoisothiazoline, etc. can be used as preservative.

Each of them may be used alone or two or more of them may be used in combination.

Rust Preventive

Examples of usable rust preventives include tolyltriazole, benzotriazole and derivatives thereof, fatty acid derivatives containing phosphorus such as octyl phosophate and dioctyl thiophosphate, imidazole, benzimidazole and derivatives thereof, 2-mercaptobenzothiazole, octyl oxymethanephosphonate, dicyclohexylammonium nitrite, diisopropylammonium nitrite, propargyl alcohol, dialkyl thiourea, saponins, etc.

Each of these compounds may be used alone or two or more of them may be used in combination.

pH-adjusting Agent

Inorganic alkalis and organic amines can be used as a pH-adjusting agent.

Specific examples of usable pH-adjusting agents include inorganic alkalis such as sodium hydroxide, potassium hydroxide, potassium phosphate, calcium hydroxide, sodium carbonate, sodium hydrogen carbonate, ammonia, etc. and organic amines such as methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine, N,N-dimethylbutylamine, 1,2-dimethylpropylamine, N-ethyl-1,2-dimethylpropylamine, allylamine, diallylamine, triallylamine, N,N-dimethylallylamine, N-methyldiallylamine, 3-pentylamine, N,N-diisopropylethylamine, 2-(hydroxymethylamino) ethanol, 2-aminopropanol, 3-aminopropanol, triethanolamine, monoethanolamine, diethanolamine, 2-amino-2-methyl-1-propanol, N-isobutyldiethanolamine, 3-methoxypropylamine, 3-propyloxypropylamine, 3-isopropyloxypropylamine, 3-butoxypropylamine, etc.

Each of these inorganic alkalis and organic amines may be used alone or two or more of them may be used in combination.

Thickener

Examples of usable thickeners include gum arabic, tragacanthgum, locustbeangum, guar gum and their derivatives, alginicacid, alginicacidsalts, pectin, carrageenan, gelatin, casein, sodium casein, xanthane gum, rhamsan gum, welan gum, gellan gum, dextran, methyl cellulose, ethyl cellulose, hydroxyethyl cellulose, carboxymethyl cellulose, hydroxypropyl cellulose, sodium starch glycolate, lanolin derivatives, chitosanderivatives, lactalbumin, polyethylene oxide, polyethylene glycol, polyvinyl alcohol, polyvinyl methyl ether, polyvinylpyrrolidone and derivatives thereof, polyacrylic acid resins, bridging polyacrylic resin, polyurethane resins, alkali metal salts of acrylic resin, etc.

Specifically, for example, Junron PW-111 (trade name, Nippon Jun-yaku Co., Ltd.), Hiviswako 103 (trade name, Wako Pure Chemical Industries, Co., Ltd.), KELZAN, KELZANAR, K1A96, K1A112, RHEOZAN and K7C233 (trade name, Sansho Co., Ltd.), JAGUAR HP-8, JAGUAR HP-60, RHODOPOL23 and RHODOPOL 50MC (trade name, Rhone Poulenc Japan, Ltd.), Echo Gum GH (trade name, Dainippon Pharmaceutical Co., Ltd.), etc. can be used.

Each of them may be used alone or two or more of them may be used in combination.

Water

Water composes a major part of the ingredients of the ink for a ballpoint pen other than the above-mentioned ingredients from colorant to thickener. Distilled water or ion-exchanged water is used in the embodiment.

The water content is preferably on the order of 30 to 80 wt % to the total amount of the ink for a ballpoint pen. If the water content is 30 wt % or less, the ink-flow rate from the point of the pen-tip decreases. On the other hand, if the water content is 80 wt % or more, the contents of the other ingredients than the above-mentioned ones are relatively large and the ink becomes unstable during the time course.

Other ingredients

In addition to the above-mentioned ingredients, resins such as ammonium salts of styrene maleic acid or ammonium salts of styrene acrylic acid maybe added as dispersant of pigment.

Production Method for Ink for a Ballpoint Pen

Method for producing ink for a ballpoint pen of the embodiment does not differe specially from those for producing conventional ink for a ballpoint pen.

That is, ink for a ballpoint pen of the embodiment can be produced by mixing and stirring the above-described ingredients.

Ballpoint Pen

Hereinafter, the ballpoint pen according to the present invention will be described.

The ballpoint pen according to the embodiment is formed to have an ink-consumption value per unit area of 0.64 to 1.6 mg/cm$^2$ and filled with ink for a ballpoint pen whose surface tension is adjusted to a range of 16 to 32 mN/m.

More specifically, the ballpoint pen according to the embodiment comprises a pen-tip and an ink reservoir.

Pen-tip

The pen-tip is provided with a ball and a holder, and the holder holds the ball freely rotatably in the distal end of the holder.

The ball is formed of a hard metal and has a diameter of 1.0 mm.

The holder is formed by cutting out a linear material of stainless steel. The holder is provided with a ball house, an ink inducing hole and so on.

The ball is placed in the ball house of the pen-tip and then a spun part is formed around the distal end of the holder, thereby holding the ball freely rotatably in the distal end of the holder.

The clearance between the ball and the holder is so adjusted that the ink-consumption value per unit area is about 0.64 to 1.6 mg/cm$^2$, that is, so that thick and bold letters can be written.

The ball may also be formed of hardened steel or ceramic.

The ball diameter is not limited to 1.0 mm and may be, for example, 0.9 mm or 1.1 mm provided that the ink-consumption value per unit area is adjusted to a value in the range of about 0.64 to 1.6 mg/cm$^2$.

The holder may be formed by cutting out a linear material of a metal, for example, nickel silver or brass, or alternatively, for example, may be formed by cutting a pipe steel material.

Ink Reservoir

The ink reservoir is formed of a resin tube. The ink reservoir is positioned and linked to the back end of the above-described pen-tip. And the ink reservoir is filled with the ink for a ballpoint pen as described above.

Production Method for a Ballpoint Pen

Method for producing a ballpoint pen of the embodiment does not differ especially from those for producing conventional ballpoint pens.

That is, a ballpoint pen can be produced by forming a pen-tip as described above, positioning an ink reservoir linking to the back end of the pen-tip, filling the ink reservoir with ink for a ballpoint pen, and then effecting a centrifugal treatment to remove air contained in the ink for a ballpoint pen.

Effect

Thus, a ballpoint pen can be provided which is less likely to cause blotting, line splitting or the like and is excellent in quick drying property when ink is transferred onto the paper surface and further less likely to cause fluctuation in the density and width of the written lines due to a storage environment and to a writing condition by adjusting the surface tension of ink for a ballpoint pen to be used in a ballpoint pen which is formed to have an ink-consumption value per unit area of 0.64 to 1.6 mg/cm$^2$ to a range of 16 to 32 mN/m.

In other words, blotting, line splitting and the like can be made less likely to occur and quick drying property when ink is transferred onto the paper surface is improved and further fluctuation in the density and width of the written lines can be prevented due to a storage environment and to a writing condition by filling a ballpoint pen which is formed to have an ink-consumption value per unit area of 0.64 to 1.6 mg/cm$^2$ with ink for a ballpoint pen whose surface tension is adjusted to a range of 16 to 32 mN/m.

If the surface tension of the ink for a ballpoint pen is 16 mN/m or less, direct flow is likely to occur and the pigment used therein likely to coagulate and sediment. On the other hand, if the surface tension of the ink for a ballpoint pen is 32 mN/m or more, blotting, line splitting and the like tend to occur and the ink transferred onto the paper surface is hard to dry and further the ink-flow rate becomes unstable due to a storage environment and to a writing condition, thereby causing fluctuation in the density and width of the written lines more likely to occur.

Addition of fluorine surfactant in an amount of 0.01 to 1.5 wt % facilitates the surface tension of the ink for a ballpoint pen to be adjusted to a range of 16 to 32 mN/m.

Hereinafter, the present invention will be illustrated in more detail by way of examples and comparative examples.

EXAMPLE 1

Ink for a ballpoint pen was prepared by blending the following ingredients:

Colorant: carbon black: 7.0 wt %

Resin: ammonium salts of styrene acrylic acid resin: 2.0 wt %

Water-soluble medium: propylene glycol: 15.0 wt %

Fluorine surfactant: perfluoroalkyl suflonate salt: 1.0 wt %

Humectant: maltitol: 5.0 wt %
Lubricant: phosphate ester: 0.6 wt %
Preservative: sodium omadine: 0.2 wt %
Rust preventive: saponin: 0.1 wt %
pH-adjusting agent: aminomethylpropanol: 0.4 wt %
Thickener: polyacrylic resin: 0.2 wt %
Water: ion-exchanged water: 68.5 wt %

EXAMPLE 2

Ink for a ballpoint pen was prepared by blending the following ingredients:
Colorant: carbon black: 7.0 wt %
Resin: ammonium salts of styrene acrylic acid resin: 2.0 wt %
Water-soluble medium: propylene glycol: 15.0 wt %
Fluorine surfactant: perfluoroalkyl suflonate salt: 0.05 wt %
Humectant: maltitol: 5.0 wt %
Lubricant: phosphate ester: 0.6 wt %
Preservative: sodium omadine: 0.2 wt %
Rust preventive: saponin: 0.1 wt %
pH-adjusting agent: aminomethylpropanol: 0.4 wt %
Thickener: polyacrylic resin: 0.4 wt %
Water: ion-exchanged water: 69.2 wt %

EXAMPLE 3

Ink for a ballpoint pen was prepared by blending the following ingredients:
Colorant: phthalocyanine blue: 7.5 wt %
Resin: ammonium salts of styrene maleic acid resin: 2.2 wt %
Water-soluble medium: glycerine: 15.0 wt %
Fluorine surfactant: fluorinated alkyl ester: 0.5 wt %
Humectant: maltitol: 3.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: polyacrylic resin: 0.3 wt %
Water: ion-exchanged water: 70.4 wt %

EXAMPLE 4

Ink for a ballpoint pen was prepared by blending the following ingredients:
Colorant: phthalocyanine blue: 1.5 wt %
Colorant: titanium oxide: 20.0 wt %
Resin: ammonium salts of styrene maleic acid resin: 2.5 wt %
Water-soluble medium: 4 mol-adduct of propylene oxide to diglycerine: 5.0 wt %
Fluorine surfactant: perfluoroalkyl phosphate ester: 1.0 wt %
Humectant: maltitol: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: Arabic gum: 0.4 wt %
Water: ion-exchanged water: 63.5 wt %

EXAMPLE 5

Ink for a ballpoint pen was prepared by blending the following ingredients:
Colorant: phthalocyanine blue: 7.5 wt %
Resin: ammonium salts of styrene maleic acid resin: 2.2 wt %
Water-soluble medium: glycerine: 15.0 wt %
Fluorine surfactant: fluorinated alkyl ester: 0.5 wt %
Humectant: maltitol: 3.0 wt %
Lubricant: potash soap: 1.0 wt %
Preservative: sodium omadine: 0.2 wt %
Rust preventive: saponin: 0.1 wt %
pH-adjusting agent: aminomethylpropanol: 0.3 wt %
Thickener: polyacrylic resin: 0.3 wt %
Water: ion-exchanged water: 69.9 wt %

Comparative Example 1

Ink for a ballpoint pen was prepared by blending the following ingredients:
Colorant: carbon black: 7.0 wt %
Resin: ammonium salts of styrene acrylic acid resin: 2.0 wt %
Water-soluble medium: propylene glycol: 15.0 wt %
Fluorine surfactant: perfluoroalkyl suflonate salt: 1.8 wt %
Humectant: maltitol: 5.0 wt %
Lubricant: phosphate ester: 0.6 wt %
Preservative: sodium omadine: 0.2 wt %
Rust preventive: saponin: 0.1 wt %
pH-adjusting agent: aminomethylpropanol: 0.4 wt %
Thickener: polyacrylic resin: 0.2 wt %
Water: ion-exchanged water: 67.7 wt %

Comparative Example 2

Ink for a ballpoint pen was prepared by blending the following ingredients:
Colorant: carbon black: 7.0 wt %
Resin: ammonium salts of styrene acrylic acid resin: 2.0 wt %
Water-soluble medium: propylene glycol: 15.0 wt %
Fluorine surfactant: none
Humectant: maltitol: 5.0 wt %
Lubricant: phosphate ester: 0.6 wt %
Preservative: sodium omadine: 0.2 wt %
Rust preventive: saponin: 0.1 wt %
pH-adjusting agent: aminomethylpropanol: 0.4 wt %
Thickener: polyacrylic resin: 0.4 wt %
Water: ion-exchanged water: 69.3 wt %

Comparative Example 3

Ink for a ballpoint pen was prepared by blending the following ingredients:
Colorant: phthalocyanine blue: 7.5 wt %
Resin: ammonium salts of styrene maleic acid resin: 2.2 wt %

Water-soluble medium: glycerine: 15.0 wt %
Fluorine surfactant: none
Humectant: maltitol: 3.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: polyacrylic resin: 0.3 wt %
Water: ion-exchanged water: 70.9 wt %

Comparative Example 4

Ink for a ballpoint pen was prepared by blending the following ingredients:
Colorant: phthalocyanine blue: 1.5 wt %
Colorant: titanium oxide: 20.0 wt %
Resin: ammonium salts of styrene maleic acid resin: 2.5 wt %
Water-soluble medium: 4 mol-adduct of propylene oxide to diglycerine: 5.0 wt %
Fluorine surfactant: perfluoroalkyl phosphate ester: 0.005 wt %
Humectant: maltitol: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: Arabic gum: 0.4 wt %
Water: ion-exchanged water: 64.5 wt %

Results of Measurement of Surface Tension and Writing Test

Surface tension of the ink for a ballpoint pen of the above-described examples 1 to 5 and comparative examples 1 to 4 was measured.

Writing test was also conducted on each of ballpoint pens filled with the ink of the above-described examples 1 to 5 and comparative examples 1 to 4.

The results are shown in the Table 1 below.

The measurement of surface tension was conducted by a vertical plane method in accordance with the ISO standard using a surface tension meter manufactured by Kyowa Interface Science Company, Ltd.

Writing test was conducted using ballpoint pens with a ball with a diameter of 1.0 mm and formed to have an ink-consumption value per unit area of 0.64 to 1.6 mg/cm$^2$.

The ink-consumption value per unit area was determined by measuring the ink-consumption value per unit length using a writing test machine in compliance with ISO standard 14145-1 under conditions at a writing speed of 4.5 m/min, a writing angle of 60° and a writing load of 100 g and dividing the thus measured value by the line width.

Writing test was conducted with a writing test machine in compliance with ISO standard 14145-1 and by "spiral writing" under the conditions at a writing speed of 4.5 m/min, a writing angle of 60° and a writing load of 100 g until the ink was used up. The test paper used for the writing test was compliant with ISO standard 14145-1.

The stability of ink-flow rate, presence or absence of the blotting, presence or absence of the line splitting, quick drying property of the written lines and the stability of ink during the time course were estimated by way of this writing test.

The stability of ink-flow rate was estimated by judging the results of the writing test in three levels as "Excellent," "Good" and "Bad" according to the following criteria:

(i) The example or comparative example in which the ink-flow rate measured at every 100 m were constant and in which thin spots or unevenness in thickness until the ink was used up were hardly observed was estimated as "Excellent;"

(ii) The example or comparative example in which the ink-flow rate measured at every 100 m varied to some extent and in which thin spots and unevenness in thickness until the ink was used up were slightly observed was estimated as "Good;" and (iii) The example or comparative example in which the ink-flow rates measured at every 100 m varied significantly and in which thin spots and unevenness in thickness until the ink was used up were obviously observed was estimated as "Bad."

Presence or absence of the blotting was estimated by judging the results of the writing test in three levels as "Excellent," "Good" and "Bad" according to the following criteria:

(i) The example or comparative example in which the occurrence of blotting was hardly observed was estimated as "Excellent;"

(ii) The example or comparative example in which the occurrence of blotting was slightly observed estimated as "Good;" and (iii) The example or comparative example in which the occurrence of blotting was obviously observed was estimated as "Bad."

Presence or absence of the line splitting was estimated by judging the results of the writing test in three levels as "Excellent," "Good" and "Bad" according to the following criteria:

(i) The example or comparative example in which the occurrence of line splitting was hardly observed was estimated as "Excellent;"

(ii) The example or comparative example in which the occurrence of line splitting was slightly observed was estimated as "Good;" and (iii) The example or comparative example in which the occurrence of line splitting was obviously observed was estimated as "Bad."

The quick drying property of the written lines was estimated by judging the results of the writing test in three levels as "Excellent," "Good" and "Bad" according to the following criteria:

(i) The example or comparative example in which the written lines got dried in 30 seconds or less after written was estimated as "Excellent;"

(ii) The example or comparative example in which the written lines got dried in 30 seconds to one minute after written was estimated as "Good;" and (iii) The example or comparative example in which the written lines did not dried in one minute after written was estimated as "Bad."

The stability of ink with time was estimated by measuring the viscosity of the ink immediately after its production and after it had been stored in a glass bottle in environment at 50° C. for one month and judging the results in two levels "Excellent" and "Bad" according to the following criteria:

(i) The example or comparative example in which viscosity change with time was hardly observed was estimated as "Excellent;" and (ii) The example or comparative example in which viscosity change with time was significantly observed was estimated as "Bad."

In Table 1, "A" stands for stability of ink-flow rate, "B" for presence or absence of the blotting, "C" for presence or absence of the line splitting, "D" for quick drying property of the written lines and "E" for stability with the ink.

TABLE 1

|  | Surface Tension (mN/m) | A | B | C | D | E |
|---|---|---|---|---|---|---|
| Ex. 1 | 17.8 | Excell. | Excell. | Excell. | Excell. | Excell. |
| Ex. 2 | 31.4 | Excell. | Excell. | Excell. | Excell. | Excell. |
| Ex. 3 | 25.0 | Excell. | Excell. | Excell. | Excell. | Excell. |
| Ex. 4 | 27.3 | Excell. | Good | Excell. | Excell. | Excell. |
| Ex. 5 | 25.0 | Excell. | Excell. | Good | Excell. | Excell. |
| Comp. Ex. 1 | 15.1 | Excell. | Excell. | Excell. | Excell. | Bad |
| Comp. Ex. 2 | 35.8 | Bad | Bad | Good | Good | Excell. |
| Comp. Ex. 3 | 34.3 | Bad | Good | Good | Good | Excell. |
| Comp. Ex. 4 | 35.2 | Bad | Bad | Good | Good | Excell. |

As indicated above, the ballpoint pens filled with ink of Examples 1 to 5 exhibited estimation as "Excellent" or "Good" on each of stability of ink-flow rate, presence or absence of the blotting, presence or absence of the line splitting, quick drying property of the written lines and stability with time of ink. That is, these ballpoint pens are less likely to cause blotting, line splitting and the like and excellent in quick drying property of the ink transferred onto the paper surface and further less likely to cause fluctuation in the density and width of the written lines due to a storage environment and to a writing condition.

On the other hand, the ballpoint pens filled with ink of Comparative Examples 1 to 4 exhibited at least one estimation as "Bad" on either one of stability of ink-flow rate, presence or absence of the blotting, presence or absence of the line splitting, quick drying property of the written lines and stability with time of ink. That is, these ballpoint pens are likely to cause blotting, line splitting and the like and poor in quick drying property of the ink transferred onto the paper surface and further likely to cause fluctuation in the density and width of the written lines due to a storage environment and to a writing conditions.

Moreover, experiments for determining the limit values of the surface tension were conducted and it was confirmed that blotting, line splitting and the like hardly occur, that the ink transferred onto the paper surface is ready to be dried and that fluctuation in the density and width of the written lines are less likely to occur due to a storage environment and to a writing condition when the surface tension is at least in a range of 16 to 32 mN/m.

It was also confirmed that, even if the fluorine surfactant is not added or other materials are added, blotting, line splitting and the like hardly occur, the ink transferred onto the paper surface is ready to be dried and fluctuation in the density and width of the written lines are less likely to occur due to a storage environment and to a writing condition as long as the surface tension is adjusted to a range of 16 to 32 mN/m.

Therefore, it was confirmed that direct flow is likely to occur and the pigment is likely to coagulate and sediment with the surface tension being 16 mN/m or less, while blotting, line splitting and the like tend to occur and the ink transferred onto the paper surface is hard to dry and fluctuation in the density and width of the written lines tend to occur depending on storage environment and writing conditions with the surface tension being 32 mN/m or more.

Further, it was confirmed that addition of fluorine surfactant in an amount of 0.01 to 1.5 wt % facilitates the surface tension of ink for a ballpoint pen to be adjusted to a range of 16 to 32 mN/m.

The prevent invention is not limited to the above-described examples.

Industrial Applicability

As described above, according to the present invention, ink for a ballpoint pen can be provided which is useful for a ballpoint pen for writing thick and bold letters, and which is less likely to cause blotting, line splitting and the like, excellent in quick drying property of the ink upon transferred onto the paper surface and further less likely to cause fluctuation in the density and width of the written lines due to a storage environment and to a writing condition.

Furthermore, according to the present invention, a ballpoint pen for writing thick and bold letter scan be provided which is less likely to cause blotting, line splitting and the like, excellent in quick drying property of the ink transferred onto the paper surface and further less likely to cause fluctuation in the density and width of the written lines due to a storage environment and to a writing condition.

What is claimed is:

1. Ink for a ballpoint pen to be used in an aqueous-gel bold ballpoint pen comprising a ball having a diameter of 0.9 mm or more formed to have an ink-consumption value per unit area of 0.64 to 1.6 mg/cm$^2$;

which includes fluorine surfactant in an amount of 0.01 to 1.5 wt %; and whose surface tension is adjusted to a range of 16 to 32 mN/m.

2. An aqueous-gel bold ballpoint pen comprising a ball having a diameter of 0.9 mm or more formed to have an ink-consumption value per unit area of 0.64 to 1.6 mg/cm$^2$;

which is filled with ink for a ballpoint pen which includes fluorine surfactant in an amount of 0.01 to 1.5 wt % and whose surface tension is adjusted to a range of 16 to 32 mN/m.

* * * * *